United States Patent [19]

Tomari et al.

[11] Patent Number: 4,990,760
[45] Date of Patent: Feb. 5, 1991

[54] IC CARD HAVING MEANS FOR PROTECTING ERRONEOUS OPERATION

[75] Inventors: Nobuhiro Tomari; Kougi Tanagawa, both of Tokyo, Japan

[73] Assignee: Oki Electric Industry Co., Ltd., Tokyo, Japan

[21] Appl. No.: 347,390

[22] Filed: May 4, 1989

[30] Foreign Application Priority Data

May 13, 1988 [JP] Japan .................. 63-114709

[51] Int. Cl.⁵ .......................... G06K 19/06
[52] U.S. Cl. .................. 235/492; 235/441; 235/485
[58] Field of Search .......... 235/492, 441, 485

[56] References Cited

U.S. PATENT DOCUMENTS 4,780,603 10/1988 Hamada .................. 235/492
4,827,111 5/1989 Kondo .
4,837,744 6/1989 Marquot .
4,864,541 9/1989 Marquot .

OTHER PUBLICATIONS

Patent Abstract of Japan; JP-A-61 46 576, vol. 10, No. 206 (-478) [2262], Jul. 18, 1986; Laid Open Mar. 6, 1986.

Primary Examiner—Harold Pitts
Attorney, Agent, or Firm—Spencer & Frank

[57] ABSTRACT

An IC card having means for protecting erroneous operation. A circuit for detecting incomplete contact is provided.

6 Claims, 3 Drawing Sheets

IC CARD HAVING MEANS FOR PROTECTING ERRONEOUS OPERATION

BACKGROUND OF THE INVENTION (1) Field of the Invention

This invention relates to an IC card having means for protecting erroneous operation due to incomplete electrical contact with an external power supply.

(2) Description of Prior Art

Recently, it has been expected that IC cards are used in many application fields, because of convenience for handling and large memory capacity. The IC cards, which have high security against injustice use by others and can perform various processes by themselves, have been highlighted as a memory medium instead of the magnetic card. The IC cards find many applications for cash cards, personal illness history cards, identification cards, etc.

An IC card is generally made of a plastic card and a semiconductor chip, for example, microcomputer chip and a memory chip sealed in the card. The IC card also has plurality of terminal pads disposed on the surface of the plastic cards. The semiconductor chip for IC card is usually a CMOS microcomputer chip which consumes less operational power.

In use, an IC card is inserted into a card reader and then receives a power supply and control signals from the card reader through the terminal pads. Data reception and transmission are carried out between the IC card and the IC card reader.

A prior art IC card is explained below with reference to FIG. 2. The prior art IC cards comprise a microcomputer 100, disposed on a plastic cards, terminal pads 10, 11, 12, 13 and 14, resistors R1, R2 and R3, and diode D1, D2, D3, D4, D5 and D6, as seen FIG. 2. The terminal pad 10 receives a positive power supply potential (VDD) (for example, +5 volts) supplied from the card reader to the microcomputer 100. The terminal pad 11 receives a resetsignal ES)/ from the card reader to the microcomputer 100. The terminal pad 12 receives a clock signal from the card reader. The terminal pad 13 receives a serial data (SIO) from the card reader and transmitts a serial data from the microcomputer 100. The terminal pad 14 receives a reference electric potential (GND) (for example, 0 volts) from the card reader. The protective resistance R1, R2 and R3 are placed between those terminal pad 11, 12 and 13, and the microcomputer. The diodes D1-D6 are connected between the terminal pads 11-13 and the terminal pad 14, forming a protective circuit together with protective resistance R1-R3. The protective circuit configuration is suitable for protecting the gate insulating layers of a CMOS input circuit (see the Japanese Patent Publication No. 48-30189).

The above mentioned IC card operates on an external power source supplied through the terminal pads thereof which is contacted mechanically with the terminal pad of the card reader. If incomplete contact between the terminal pads and the card reader occurs, a potential supplied through the resetsignal input terminal pad 11, the clock signal input terminal pad 12 and the serial signal terminal pad 13, is supplied to the power supply line through the resistors R1, R2 and R3, and the diodes D1 to D6. The potential is dropped by the protective resistors and the diodes, and is unstable because clock signals are input. However the microcomputer formed of CMOS circuits can incompletely operate on such a dropped voltage. Incomplete contact between terminal pads and a card reader may destroy data stored in an EEPROM or an EPROM in the microcomputer.

SUMMARY OF THE INVENTION

The object of the present invention is to provide an IC card which is able to prevent erroneous operation of its internal circuit even if incomplete contact occurs between terminal pads and an IC card reader.

According to the present invention, there is provided an IC card having a power supply potential detector, and a reset signal generator to generate a reset signal in response to an output signal receiving signal of the detector.

DETAILED DESCRIPTION OF THE PREFERRED EMBODIMENT

Figure 1:
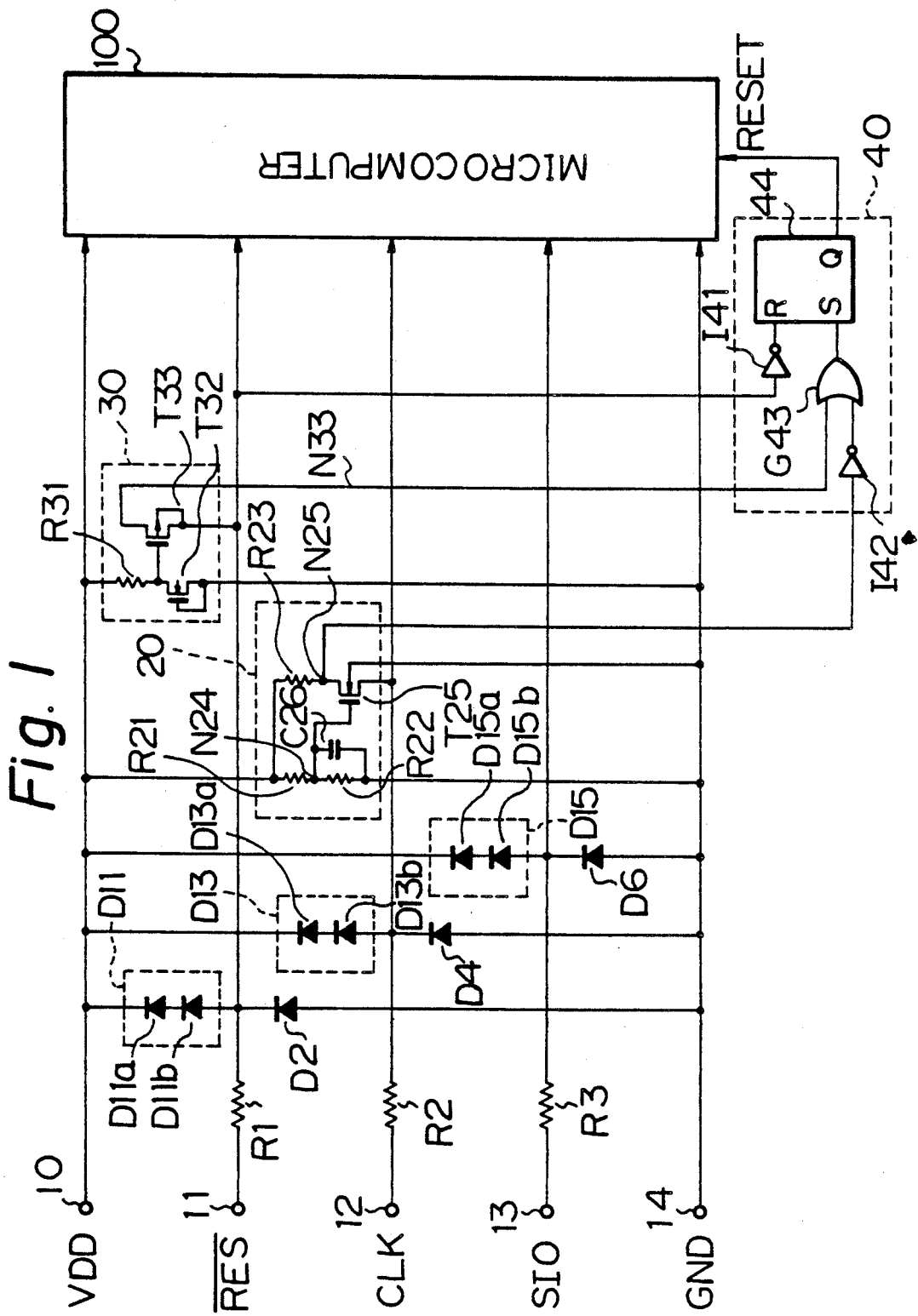
FIG. 1 is a circuit diagram of an IC card having a erroneous operation prevention function according to this invention.
Figure 2:
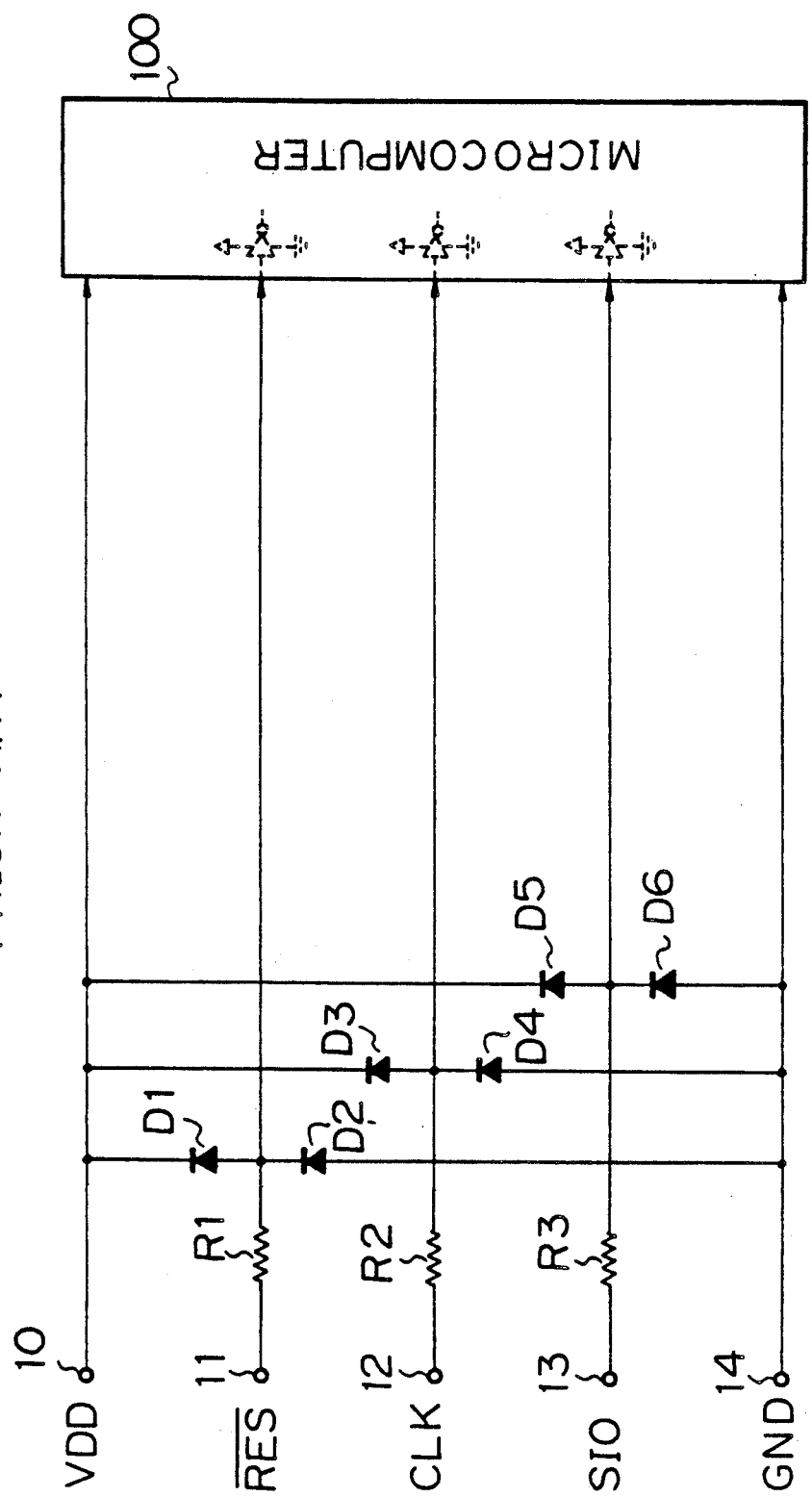
FIG. 2 is a circuit diagram of a prior art IC card.

In FIG. 1, an IC card comprises a microcomputer 100, protective resistors R1, R2, and R3, protective diodes reversely connected D2, D4 and D6, and an erroneous operation preventive circuit. A power supply terminal pad 10 (VDD) is provided with a positive potential of +5 volts from an external card reader. A resetsignal input terminal pad 11 ES)/ is provided with a resetsignal from the card reader which initializes the microcomputer. A clock signal input terminal pad 12 (CLK) is provided with a clock signal from the card reader. A terminal pad 13 (SIO) relays data in a serial form between the microcomputer 100 and the card reader. A ground terminal pad (GND) is provided with a potential of 0 volts from the card reader. A protective resistor R1 is coupled between the terminal pad 11 and the gate electrode in a CMOS input circuit of the microcomputer, and R2 between the terminal pad 12 and a gate electrode in a CMOS input circuit of the microcomputer, and R3 between the terminal pad and the gate electrode in a CMOS input circuit of the microcomputer. A potential reducing circuit D11 is coupled between the power supply terminal pad 10 and the gate electrode of the CMOS input circuit. The potential reducing circuit D11 is formed of diodes D11a and D11b serially connected, the cathode being connected to the power supply terminal pad, and the anode being connected to the gate electrode of the CMOS input circuit. A protective diode D2 is coupled between the gate electrode of the CMOS input circuit and the ground terminal pad, the cathode being connected to the gate electrode of the CMOS input circuit and the anode being connected to the ground terminal pad. An electrostatic breakage preventing circuit for the CMOS input circuit I1 comprises the protective resistor R1, the potential reducing circuit D11, and the protective diode D2. In the same way, an electrostatic breakage preventing circuit for the CMOS input circuit I2 comprises the protective resistor R2, the potential reducing circuit D13, and the protective diode D4. An electrostatic breakage preventing circuit for CMOS input circuit I3 comprises the protective resistor R3, the potential reducing circuit D15, and the protective diode D6.

An erroneous operation preventing circuit comprises the potential reducing circuits D11, D12 and D13, a ground potential detector 20, a power supply potential detector 30, and a reset signal generator 40.

The ground potential detector 20 comprises a potential dividing resistive circuit, an N-channel transistor T25 and a capacitor C26. The potential dividing resistive circuit comprises resistors R21 and R22 serially connected between the power supply terminal pad 10 and the ground terminal pad. The drain electrode of an N-channel transistor T25 is connected to the power supply terminal pad 10, the source electrode is connected to the clock signal line, and the gate electrode is connected to the node N24 of the resistive voltage divider. The capacitor C26 is connected parallelly to the resistor R22.

The ground potential detector 20 detects a potential more than zero volts at the ground terminal pad 14, and outputs a detecting signal at the drain of the transistor T25. The power supply potential detector 30 comprises a protective N-channel transistor T32, a resistor R31 and a P-channel transistor T33. The protective N-channel transistor T32 has the drain electrode connected to the power supply terminal pad 10 through the resistor 31, and both the source electrode and the gate electrode connected to the ground terminal pad 14. The P-channel transistor T33 has the drain electrode connected to the node N33, the source electrode connected to the reset line, gate electrode connected to the drain of the protective transistor. The power supply potential detector 30 detects a potential less than a power supply potential (for example +5 volts) and outputs a detecting signal from the drain of transistor T33 to the reset signal generator 40.

The reset signal generator 40 comprises inverters I41, I42, an OR gate G43 and a R/S flipflop 44. The reset signal input terminal of the R/S flip flop 44 is connected to the reset line through the inverter I41, and the set terminal is connected to the output of the OR gate G43. The OR gate G43 is connected to an output signal of the ground potential detector 20 through the inverter I42 and to the node N33 of the power supply potential detector 30. The reset signal generator 40 is initialized by the resetsignal received at the terminal pad 11, and outputs the reset signal to the microcomputer by receiving an output signal of the ground potential detector 20 or the power supply potential detector 30.

Next, operation of an erroneous operation prevention circuit suitable for an IC card according to this invention is explained below.

Let us assume that the power supply terminal pad 10 is incompletely contacted to an external card reader, but both the resetsignal input terminal pad 11 and the ground terminal pad 14 are in contact with the card reader to be provided with +5 volts and 0 volts, respectively.

Figure 3:
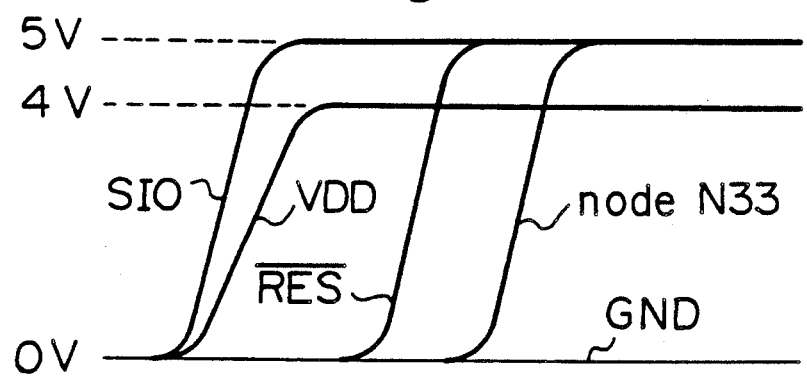
FIG. 3 is a waveform diagram at various nodes of a positive power supply potential detector for an IC card according to this invention.

In this case, the power supply potential detector 30 detects incomplete contact between the power supply terminal pad 10 and the card reader. The power supply potential detector 30 operates in accordance with the waveforms shown in FIG. 3.

A potential of 4 volts appears at the power supply terminal 14 in spite of the defective contacts between the power supply terminal pad 10 and the card reader, since the potential reducing circuit 13 decreases the power supply potential (5 volts).

The power supply terminal pad 10 is at 4 volts and the source electrode of the P-channel transistor T33 a is at +5 volts, and the drain electrode of the protective transistor T32 is at 0 volts. The protective transistor T32, an N-channel transistor, is in off state. The protective circuit for the P-channel transistor T33 consist of the protective transistor T32 and the resistor R31. Since the potential of the gate electrode receives 4 volts, the P-channel transistor T33 turns on to output an "H" level signal to the reset signal generator 40. This means that the potential at the gate electrode of the P-channel transistor T33 is less than that of the resetsignal input terminal pad 11. For this reason, the power supply potential detector 30 also can detect an sudden drop in voltage at the power supply terminal pad 10, even if the terminal pad 10 is completely contacts to the external card reader.

In case both the power supply terminal pad 10 and clock signal input terminal pad 12 are completely contacted to the card reader to receive +5 volts and a clock signal having a swing of 0 to +5 volts, respectively, while the ground terminal pad 14 is incompletely contacted to the card reader, the ground potential detector 20 detects incomplete contact between the ground terminal pad 14 and the card reader.

Figure 4:
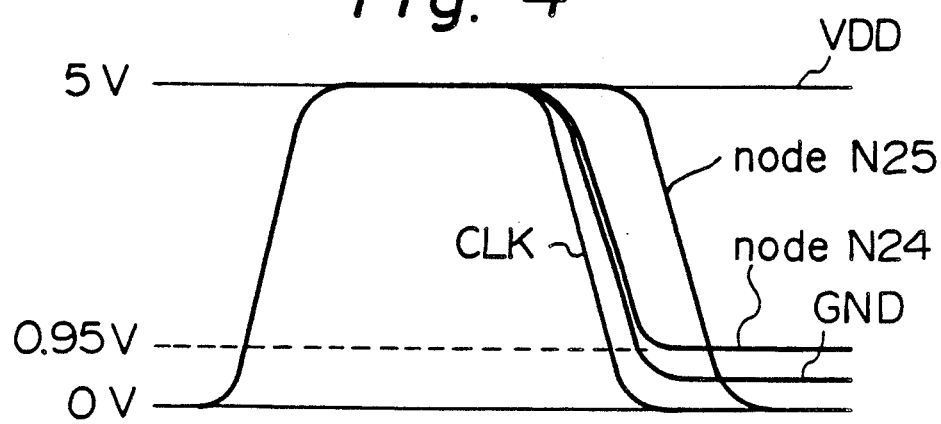
FIG. 4 is a waveform diagram at various nodes of a ground potential detector for an IC card according to this invention.

The ground potential detector 20 operates in accordance with the waveforms shown in FIG. 4. When the clock signal terminal pad 12 is in an "L" level, the ground terminal pad 14 becomes 0.5 volts. In the ground potential detector 20, the substrate potential of the N-channel transistor T25 is 0.5volts and the source electrode potential of the N-channel transistor T25 is 0 volts. The resistance ratio of the resistors R21 and R22 are selected in that the transistor T25 turns on when the ground terminal pad 14 is in the uncontact condition, and it does not turn on when the ground terminal pad 14 is in the contact condition. Preferably, the resistance ratio is 9:1, which turns the transistor T25 on to output an "L" level signal to the reset signal generator 40 when the ground terminal pad 14 rises to about 0.5 volts. The capacitor C26 bypasses a potential rise on the ground terminal pad 14 due to noise to prevent the ground potential detector 20 from unnecessarily outputting a detecting signal.

The ground potential detector 20 can output a detecting signal when the potential of the ground terminal pad 14 rises the threshold potential of a diode.

The reset signal generator 40 sends a reset signal to the microcomputer chip 100 in response to a detecting signal from the ground potential detector 20 or the power supply potential detector 30.

Figure 5:
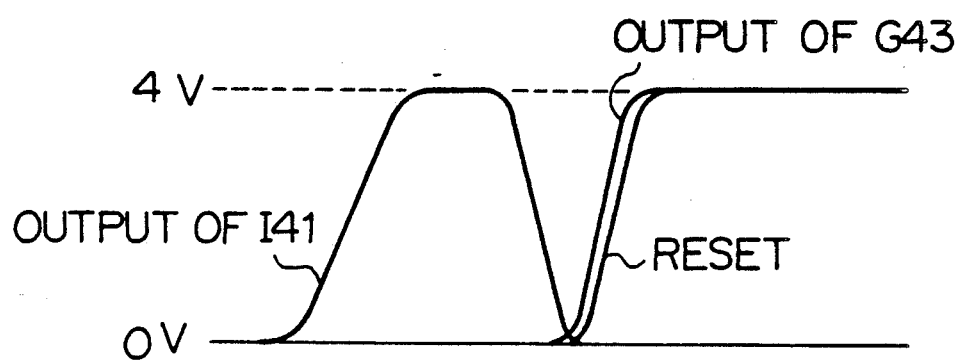
FIG. 5 is a waveform diagram at various nodes of a reset signal generator for an IC card according to this invention.

The reset signal generator 40 operates in accordance with waveforms showing in FIG. 5.

The R/S flipflop 44 is reset in response to a resetsignal on the resetsignal input terminal pad 11. Then, the R/S flipflop 44 receives a detecting signal from OR gate G43 to output a reset signal of an "H" level signal to the microcomputer 100.

As a result, the reset signal generator 40 continues to send a rest signal to stop operation of the microcomputer 100 while an IC card and an external card reader are in uncontact condition.

What is claimed is:

1. An IC card having means for protecting erroneous operation comprising:
   a plastic card having a plurality of terminal pads located on the surface thereof, said plurality of terminal pads including a positive power supply terminal pad, a ground terminal pad, a resetsignal input terminal pad, and a clock signal input terminal pad;
   an IC chip locating in said plastic IC card and being connected to said plurality of terminal pads;
   a potential reducing circuit connected between said positive power supply terminal pad and said reset terminal pad; and
   means for protecting erroneous operation of said IC chip comprising a first circuit for detecting incomplete contact between said power supply terminal pad and an external devise to output a detecting signal, and a second circuit for generating a reset signal to stop operation of said IC chip in response to said detecting signal.

2. An IC card according to claim 1, wherein the said first circuit has a transistor having a gate electrode receiving a potential on said power supply terminal pad, a source electrode connected to said resetsignal input terminal pad, a drain electrode connected to an input of said reset signal generator.

3. An IC card according to claim 1, wherein said first circuit has a resistive potential divider connected between said positive power supply terminal pad and said ground terminal pad to produce a divided potential, and a transistor having a gate electrode receiving said divided potential, a drain electrode connected to said power supply terminal pad through a resistor and connected to an input of said resetsignal input terminal pad, and a source electrode connected to said clock signal input terminal pad.

4. An IC card according to claim 1, wherein the said detector for said positive power supply terminal pad and said first circuit has a transistor having a gate electrode receiving a potential on said power supply terminal pad, a source electrode connected to said resetsignal input terminal pad, a drain electrode connected to an input of said reset signal generator, and has a resistive potential divider connected between said positive power supply terminal pad and said ground terminal pad to produce a divided potential, and a transistor having a gate electrode receiving said divided potential, a drain electrode connected to said power supply terminal pad through a resistor and connected to an input of said resetsignal input terminal pad, and a source electrode connected to said clock signal input terminal pad.

5. An IC card according to claim 1, wherein said the potential reducing circuit comprises a plurality of diodes serially connected.

6. An IC card according to claim 1, wherein said second circuit comprises a flip-flop circuit.

* * * * *